US010579089B2

(12) United States Patent
Adoline et al.

(10) Patent No.: US 10,579,089 B2
(45) Date of Patent: Mar. 3, 2020

(54) MODULAR NON-LINEAR SPRING SYSTEM

(71) Applicant: Barnes Group Inc., Bristol, CT (US)

(72) Inventors: Jack Adoline, Holland, OH (US); Joaquin Davis, Bristol, CT (US); Jason Sicotte, Bristol, CT (US)

(73) Assignee: Barnes Group Inc., Bristol, CT (US)

( * ) Notice: Subject to any disclaimer, the term of this patent is extended or adjusted under 35 U.S.C. 154(b) by 130 days.

(21) Appl. No.: 15/665,872

(22) Filed: Aug. 1, 2017

(65) Prior Publication Data

US 2018/0039298 A1 Feb. 8, 2018

Related U.S. Application Data

(60) Provisional application No. 62/369,889, filed on Aug. 2, 2016.

(51) Int. Cl.
*B60T 8/40* (2006.01)
*G05G 5/03* (2008.04)
*B60T 11/16* (2006.01)
*F16F 3/02* (2006.01)
*F16F 3/04* (2006.01)
*B60T 7/06* (2006.01)

(52) U.S. Cl.
CPC .............. *G05G 5/03* (2013.01); *B60T 11/165* (2013.01); *F16F 3/02* (2013.01); *F16F 3/04* (2013.01); *B60T 7/06* (2013.01); *B60T 8/4086* (2013.01); *F16F 2228/066* (2013.01); *G05G 2505/00* (2013.01)

(58) Field of Classification Search
CPC .................................................... B60T 8/4086
See application file for complete search history.

(56) References Cited

U.S. PATENT DOCUMENTS

| 3,233,947 | A | 8/1966 | Oberthur |
| 4,275,934 | A | 6/1981 | MacDonald |
| 4,678,243 | A | 7/1987 | Leiber |
| 6,347,518 | B1 | 2/2002 | Kingston et al. |
| 9,079,570 | B2 * | 7/2015 | Sellinger ................. B60T 7/042 |
| 9,139,168 | B2 * | 9/2015 | Jeon ........................ B60T 7/042 |
| 2002/0117893 | A1 | 8/2002 | Shaw et al. |
| 2006/0048512 | A1 | 3/2006 | Ohlig et al. |

OTHER PUBLICATIONS

U.S. Search Authority, International Search Report and Written Opinion for related PCT Application No. PCT/US2017/044850 (dated Oct. 12, 2017).

* cited by examiner

*Primary Examiner* — F Daniel Lopez
(74) *Attorney, Agent, or Firm* — Fay Sharpe LLP

(57) ABSTRACT

A modular non-linear spring system capable of simulating traditional brake pedal feel when incorporated into a hydraulic and/or electro-hydraulic vehicle braking system. The system can include a first spacer having a top surface and a bottom surface and an optional second spacer having a top surface and a bottom surface. In one arrangement, a first mechanical spring is in abutting engagement with the top surface of said first spacer, a second mechanical spring is in abutting engagement with the bottom surface of said first spacer and the top surface of said second spacer, and an optional third mechanical spring is in abutting engagement with the bottom surface of said second spacer. The springs are arranged to be progressively compressed using a brake pedal of the braking system.

16 Claims, 5 Drawing Sheets

US 10,579,089 B2

MODULAR NON-LINEAR SPRING SYSTEM

CROSS REFERENCE TO RELATED APPLICATIONS

This application claims priority to and the benefit of the filing date of U.S. Provisional Patent Application Ser. No. 62/369,889, filed Aug. 2, 2016, which application is incorporated by reference in its entirety.

The present disclosure relates to spring systems, particularly to spring systems having a non-linear force versus stroke profile, and more particularly to a non-linear spring system that can be used in a hydraulic and/or electro-hydraulic vehicle braking system, and which is capable of simulating traditional brake pedal feel.

BACKGROUND OF THE INVENTION

Motorized vehicles are generally slowed and/or stopped with hydraulic brake systems. A basic brake system generally includes a brake pedal, a master cylinder, brake fluid conduits arranged in two similar but separate brake circuits, and wheel brakes in each circuit. The driver of the vehicle operates the brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow or stop the vehicle. Generally, when the brake pedal is first compressed, there is little resistance to the initial movement of the brake pedal during depression. As the brake pedal is further depressed by a user, the force required for further pedal depression increases. Generally, the force required to initially depress the brake pedal to the force required for full depression of the brake pedal is a non-linear force curve.

Recently, advanced vehicle braking systems, such as, for example, electro-hydraulic braking systems, have been designed. In such systems, the master cylinder is typically a separate component from the vehicle's brakes. In such systems, an electronic control unit is provided to respond to brake demand signals and to control the operation of pumps which apply pressurized brake fluid to the wheel brakes of each brake circuit. As such, when the brake pedal is actuated, it does not typically directly actuate the wheel brakes, but rather acts to generate a brake demand signal which is used as an input signal to an electronically-controlled vehicle braking system. One disadvantage of such systems is that the brake pedal does not feel or behave like a brake pedal in a hydraulic braking system (e.g., in a non-linear, progressively increasing pedal force).

Non-limiting examples of existing prior art pedal feel simulator devices for vehicle braking systems are described in U.S. Pat. Nos. 6,347,518 and 6,746,088, US Publication Nos. 2003/0205932, US 2014/0138888, US 2014/0159473, and WO 2014/145447A1, all of which are incorporated herein by reference. These prior art simulator devices are generally complicated systems and cannot be easily customized for a particular use.

A need has been identified for a spring system that can be used in a hydraulic and/or electro-hydraulic vehicle braking system which can simulate the feel of a traditional brake pedal as experienced in a conventional hydraulic vehicle braking system, and which can easily be customized for different types of brake systems or for other types of uses that benefit from a non-linear force verse stroke profile for a spring system.

SUMMARY OF THE INVENTION

The present disclosure is directed to a novel modular non-linear spring system suitable for use in electro-hydraulic vehicle braking systems. Although the novel modular non-linear spring system will be described with particular reference for use in vehicle brake systems, it will be appreciated that the novel modular non-linear spring system can be used in many other applications wherein it is advantageous to use a spring system having a non-linear force versus stroke curve. The present disclosure particularly relates to a modular non-linear spring system comprising a mechanical spring system which simulates the traditional brake pedal feel as typically experienced in hydraulic braking systems. The concept being described utilizes the mechanical spring system to provide a brake pedal feel with non-linear, progressively increasing stroke length versus pedal force characteristics.

Typical hydraulic and/or electro-hydraulic braking systems include a master cylinder having an internal cavity and a piston at least partially housed in said internal cavity. The piston is typically either directly or indirectly connected to a brake pedal. Depression and release of the brake pedal causes the piston to reciprocate in the internal cavity of the master cylinder, thereby pressurizing brake fluid to cause the brake pad to engage the brake discs of the vehicle.

In one non-limiting aspect of the present disclosure, there is provided a modular non-linear spring system which can be used as a component of a hydraulic and/or electro-hydraulic vehicle braking system. The modular non-linear spring system can be configured to fit into the internal cavity of the master cylinder of existing and future hydraulic and/or electro-hydraulic brake systems; however, this is not required. In one non-limiting configuration, the modular non-linear spring system of the present disclosure is positionable in the internal cavity of the master cylinder between the base of the master cylinder and the piston; however, this is not required. As can be appreciated, other arrangements can be used.

In another and/or alternative non-limiting aspect of the present disclosure, the modular non-linear spring system of the present disclosure is configured to compressibly interact with the brake pedal of a brake system; however, this is not required. In one non-limiting arrangement, the modular non-linear spring system is integrated in an electro-hydraulic vehicle braking system wherein one or more portions of the modular non-linear spring system are caused to compress as the brake pedal engages the modular non-linear spring system.

In another and/or alternative non-limiting aspect of the present disclosure, the modular non-linear spring system of the present disclosure includes two or more springs. The springs can include the same or different types of springs (e.g., linear mechanical springs, non-linear mechanical springs, mechanical Belleville springs, gas springs, etc.). The two or more springs are not limited by type, size, shape, cross-sectional area, and/or material. In one non-limiting configuration, the modular non-linear spring system includes two or more mechanical springs (e.g., helical spring, Belleville spring, clover dome washer, etc.). The two or more mechanical springs can comprise a generally helical shape and include a uniform pitch; however, this is not required. As can be appreciated, when two or more mechanical springs are used, the pitch of the two or more mechanical springs can be non-uniform or varying pitch; however, this is not required. When two or more mechanical springs are used, the type, size, and shape of the two or more mechanical springs are non-limiting. The two or more mechanical springs can be formed from a variety of materials (e.g., metal, plastic, polymer material, rubber, composite material, etc.). The compressibility of the two or more mechanical springs can be the same or different. The mechanical spring free length, wire type, wire thickness, cross-sectional shape and/or area of the wire, cross-sectional shape and/or area of the spring, number of windings, wire material, and/or spring force of each mechanical spring can be the same or different. The free length of the two or more mechanical springs can be greater than, equal to, or less than the longitudinal length of the modular non-linear spring system. Another one non-limiting configuration, the modular non-linear spring system includes three springs. The three springs can be structurally and/or functionally the same or different from one another. In one such configuration, the three-spring system includes three mechanical helical springs. In another such configuration, the three-spring system includes two mechanical helical springs and one Belleville spring. In another such configuration, the three-spring system includes one mechanical helical spring and two Belleville springs.

In another and/or alternative non-limiting aspect of the present disclosure, the modular non-linear spring system includes a first, second, and third mechanical spring arranged in a series configuration, wherein one or more springs are separated by a spacer; however, this is not required. The spacers (when used) are not limited in size, shape, or material. Non-limiting examples of materials used to form the spacers include metal, plastic, polymer material, rubber, composite material, etc. In embodiments where one or more spacers are used, the shape of the two or more spacers can be the same or different. Generally, the shape of the one or more spacers can be configured to match and/or correspond with the internal cavity of the master cylinder; however, this is not required. As such, the one or more spacers can be configured to be movable within the internal cavity of a master cylinder; however, this is not required. In embodiments where one or more spacers are used, at least a portion of a first spacer can be configured to interact with the piston or structures connected to the piston as the piston moves within the internal cavity of the master cylinder, and at least a portion of a second spacer can be configured to interact with one or more portions of the internal cavity of the master cylinder; however, this is not required. In one non-limiting configuration wherein two spacers and three mechanical springs are used, the first spacer can be provided between a first and second mechanical spring, and the second spacer can be provided between the second and third mechanical springs; however, this is not required. As can be appreciated, when two or more mechanical springs are located on the same side of a spacer, one or more of the mechanical springs can optionally be in a nested relationship and have the same or different direction of windings; however, this is not required.

In one non-limiting aspect of the present disclosure, the modular non-linear spring system of the present disclosure can include, but is not limited to, a 1) first spacer providing a top and bottom surface, 2) second spacer providing a top and bottom surface, 3) first mechanical spring positionable at or near the top surface of said first spacer, 4) second mechanical spring positionable at least partially between the bottom surface of said first spacer and the top surface of said second spacer, and/or 5) third mechanical spring positionable at or near the bottom surface of said second spacer.

A non-limiting overview of a modular non-linear spring system of the present disclosure that includes three springs is as follows:

1) The first spring can be connected to the top surface of the first spacer; however, this is not required. The configuration of the connection arrangement is non-limiting (e.g., threaded end, connection hole, grooves, ribs, slots, notches, hook, etc.). Similarly, the first spring can be connected to the spacer by any number of means (e.g., adhesive, screw, rivet, nail, pin, solder, weld bead, melted bond, etc.). The first spring is configured to extend outwardly from the top surface of the first spacer and can be configured to be compressible. As such, the first spring can compress and decompress against the top surface of the first spacer. The first spring can be positioned along the central longitudinal axis of the first spacer; however, this is not required. The first spring can be a multi-rate spring (i.e., non-linear spring); however, this is not required.

2) The length, shape, configuration and material of the first spacer are non-limiting. The first spacer generally has a tubular shape and the cross-sectional shape of the first spacer is generally circular; however, this is not required. The cross-sectional area of the portion of the first spring that compresses and decompresses relative to the top surface of the first spacer is generally less than the cross-sectional area of the first spacer; however, the cross-sectional area can be the same as the cross-sectional area of the first spacer. The top end of the first spring (i.e., the longitudinal end opposite the first spacer) optionally includes a connection arrangement that is used to connect the first spring to a piston or a structure connected to a piston; however, this is not required. The connection arrangement (when used) between the first spring and the first spacer is non-limiting.

3) The second spring can be positioned between the first spacer and a second spacer or forms the end of the modular non-linear spring system. The second spring and the first spring can be the same or different. The second spring can be connected at its longitudinal ends to the bottom surface of the first spacer and the top surface of the second spacer; however, this is not required. The configuration of the connection arrangement is non-limiting (e.g., threaded end, connection hole, grooves, ribs, slots, notches, hook, etc.). Similarly, the second spring can be connected to the first and second spacers by any number of means (e.g., adhesive, screw, rivet, nail, pin, solder, weld bead, melted bond, etc.). The second spring is configured to extend outwardly from and between the bottom surface of the first spacer and the top surface of a second spacer (when used) and can be configured to be compressible. As such, the second spring can compress and decompress against the bottom surface of the first spacer and/or the top surface of the second spacer (when used). The second spring can be positioned along the central longitudinal axis of the first spacer and the second spacer (when used); however, this is not required.

4) The length, shape, configuration and material of the second spacer are non-limiting. The second spacer generally has a tubular shape and the cross-sectional shape of the second spacer is generally circular; however, this is not required. In one non-limiting configuration, the second spacer is the same in structure and function as the first spacer; however, this is not required.

5) The third spring (when used) can be connected to the bottom surface of the second spacer; however, this is not required. The configuration of the connection arrangement is non-limiting (e.g., threaded end, connection hole, grooves, ribs, slots, notches, hook, etc.). Similarly, the third spring can be connected to the spacer by any number of means (e.g., adhesive, screw, rivet, nail, pin, solder, weld bead, melted bond, etc.). The third spring can extend outwardly from the bottom surface of the second spacer and can be configured to be compressible. As such, the third spring can compress and decompress against the bottom surface of the second spacer. The third spring can be positioned along the central longitudinal axis of the second spacer; however, this is not required. The third spring can be the same or different as the first and second springs. The three springs (when used) can be the same type of spring; however, this is not required. In one non-limiting configuration, the first and second springs are coil springs (which coil springs may be the same or different) and the third spring is a Belleville spring or clover dome washer; however, this is not required.

In another and/or alternative non-limiting aspect of the present disclosure, the modular non-linear spring system can be easily customized for various applications by simply changing one or more of the springs in the modular non-linear spring system and/or the number of springs in the modular non-linear spring system; however, this is not required.

In another and/or alternative non-limiting aspect of the present disclosure, the modular non-linear spring system can optionally be adjusted by a user (e.g., driver). In one non-limiting configuration, the modular non-linear spring system is adjustable such that a driver of a vehicle can adjust one or more characteristics or components of the modular non-linear spring system and, thus, the pedal feel; however, this is not required. For example, the modular non-linear spring system can be customizable by a driver to adjust the feel of braking for one or more braking performances and/or to simulate a desired driving and/or braking style, such as, for example, standard braking, performance braking, luxury braking, sport braking, etc. In one non-limiting configuration, the modular non-linear spring system can be integrated with a computer; however, this is not required. In such a configuration, the braking preferences of one or more drivers can be set and/or recorded when one or more drivers operate the same vehicle; however, this is not required. As can be appreciated, the operation of such system can be automatic and/or manually operated. As can be appreciated, a gas spring can be used to adjust the feel of braking by adjusting the gas content in the gas spring; however, this is not required.

In another and/or alternative non-limiting aspect of the present disclosure, there is provided a modular non-linear spring system suitable for use as a pedal feel simulator. The modular non-linear spring system can be housed within a master cylinder; however, this is not required. The modular non-linear spring system includes one or more mechanical springs which are capable of providing a non-linear, progressively increasing pedal force. In one non-limiting configuration, the modular non-linear spring system includes two or more springs. In one non-limiting configuration, each spring can have a different size and shape and, therefore, is capable of generating different spring forces; however, this is not required.

In operation, the modular non-linear spring system of the present disclosure can be used as part of a hydraulic and/or electro-hydraulic vehicle braking system. When a driver depresses the brake pedal, the pedal causes a piston to move in a first direction toward the modular non-linear spring system, thereby causing pressure on the first spring to increase. As a result, the first spring begins to compress. When the pressure exerted by the piston on the first spring exceeds or nearly exceeds a predetermined capacity of the spring (e.g., 5-95% of the capacity of the spring and all values and ranges therebetween) to further compress, the movement of the piston causes the pressure on the second spring to increase and, therefore, the second spring begins to compress. When the pressure exerted by the piston on the first spring and the second spring exceeds or near exceeds a predetermined capacity the second spring (e.g., 5-95% of the capacity of the spring and all values and ranges therebetween) to further compress, the continued movement of the piston causes the third spring to begin to compress. As such, as the driver continues to depress the brake pedal so as to actuate the brakes, the pressure on the three springs increases sequentially from the first spring to the second spring to the third spring in a step-wise (or progressive) manner, thereby modularly increasing the stiffness of the brake pedal as the brake pedal is increasingly depressed. As can be appreciated, when the second spring is in the process of being compressed, the first spring can also be further compressed; however, this is not required. Likewise, when the third spring is being compressed, the first and/or second spring can also be further compressed; however, this is not required. The degree of compression of a spring before compression of another spring begins can be selected. In one non-limiting arrangement, the modular non-linear spring system is configured such that the first spring is compressed to 85-99% prior to the second spring compressing more than 5-10%. In another or additional non-limiting arrangement, the modular non-linear spring system is configured such that the second spring is compressed to 85-99% prior to the third spring compressing more than 5-10%.

The modular non-linear spring system of the present disclosure provides a modularized pedal force for every stroke length. In one non-limiting configuration, the stroke length versus pedal force relationship provides a non-linear, progressively increasing relationship.

In summary, the present invention relates to modular non-linear spring system suitable for use in a vehicle braking system, wherein the modular non-linear spring system includes a first spacer having a top surface and a bottom surface, a first spring in abutting engagement with the first spacer, a second spring in abutting engagement with the first spacer, and wherein the first and second springs are sequentially compressible whereby compression of one or more of the modular non-linear spring system provides a non-linear, progressively increasing mechanical spring force. As can be appreciated, sequential compression is not limited to the first spring compressing before the second spring. Sequential compression also includes the second spring compressing before the compressing of the first spring. If the modular non-linear spring system includes three springs, sequential compression includes 1) the first spring first compressing, then the second spring compressing, then the third spring compressing, 2) the second spring first compressing, then the first spring compressing, then the third spring compressing, 3) the second spring first compressing, then the third spring compressing, then the first spring compressing, 4) the third spring first compressing, then the first spring compressing and then the second spring compressing, or 5) the third spring first compressing, then the second spring compressing and then the first spring compressing.

The modular non-linear spring system can also optionally include a second spacer having a top surface and a bottom surface.

The modular non-linear spring system can also optionally include a third mechanical spring in abutting engagement with the bottom surface of second spacer, and the first, second and third mechanical springs are sequentially compressible whereby compression of one or more of the mechanical springs in said modular non-linear spring system provides a non-linear, progressively increasing mechanical spring force.

The modular non-linear spring system can also optionally include at least two springs that have different properties, sizes, spring rates, types, or combinations thereof.

The modular non-linear spring system can also optionally include a plurality of springs wherein each of the springs has different properties, sizes, spring rates, types, or combinations thereof.

The modular non-linear spring system can also optionally include a clover dome washer, a coil spring and/or a Belleville washer.

The modular non-linear spring system can also optionally include a first spring in the form of a clover dome washer, a second spring in the form of a coil spring, and a third spring in the form of a Belleville washer.

The modular non-linear spring system can also optionally include at least one of the spacers having a rectangular cross-sectional shape.

The modular non-linear spring system can also optionally include at least one of the spacers having a circular cross-sectional shape.

The modular non-linear spring system can also optionally include first and second mechanical springs being coil springs, and the third optional mechanical spring being a Belleville washer.

The modular non-linear spring system can also optionally have first and second mechanical springs and optionally a third mechanical spring, and wherein each spring has an uncompressed axial length and a compressed axial length, and wherein the uncompressed length of one of the mechanical springs is greater than the uncompressed lengths of one or both of the other mechanical springs.

The modular non-linear spring system can also optionally have one or more of the springs connected to a spacer.

The modular non-linear spring system can also optionally have at least one of the springs be a multi-rate spring.

The modular non-linear spring system can also optionally be used in a hydraulic brake system, wherein the hydraulic brake system includes a master cylinder having a cavity and a piston supported in the cavity, and the modular non-linear spring system is at least partially supported in the cavity and engageable with the piston of the master cylinder. One or more spacers (when used) can optionally be movable within the cavity. Two or more or all of the springs can optionally be coaxially aligned along a common axis of the cavity.

The invention also pertains to a method for using a modular non-linear spring system. One such non-limiting method includes the use of the modular non-linear spring system to simulate traditional brake pedal feel in a brake pedal of a braking system. Such a non-limiting method includes providing the modular non-linear spring system and compressing two or more springs in progression with the brake pedal.

One non-limiting object of the present disclosure is the provision of a modular non-linear spring system suitable for use in a hydraulic and/or electro-hydraulic vehicle braking system.

Another and/or alternative non-limiting object of the present disclosure is the provision of a modular non-linear spring system which includes a first, second, and optionally a third spring oriented in a series configuration, wherein the first and second springs are optionally separated by a first spacer, and the second and optional third springs are optionally separated by a second spacer.

Another and/or alternative non-limiting object of the present disclosure is the provision of a modular non-linear spring system which can be housed within the internal cavity of a master cylinder, wherein downward movement of a piston provided in the internal cavity of said master cylinder sequentially compresses the springs.

Another and/or alternative non-limiting object of the present disclosure is the provision of a modular non-linear spring system wherein the compression of one or more springs in the modular non-linear spring system provides a non-linear, progressively increasing spring force.

Another and/or alternative non-limiting object of the present disclosure is the provision of a modular non-linear spring system which simulates the traditional brake pedal feel as typically experienced in a hydraulic braking system.

Another and/or alternative non-limiting object of the present disclosure is the provision of a modular non-linear spring system of a simple and reliable design.

Another and/or alternative non-limiting object of the present disclosure is the provision of a modular non-linear spring system which can be used on pre-existing and future makes and models of various motorized vehicles.

Another and/or alternative non-limiting object of the present disclosure is the provision of a modular non-linear spring system which can be adjusted to one or more different driving styles (e.g., traditional, luxury, performance, sport, etc.).

Another and/or alternative non-limiting object of the present disclosure is the provision of a modular non-linear spring system which can be easily customized for a particular application by merely selecting one or more of the mechanical springs used in the modular non-linear spring system.

These and other objects and advantages will become apparent from the discussion of the distinction between the present disclosure and the prior art and when considering the non-limiting embodiments of the disclosure as shown in the accompanying drawings.

BRIEF DESCRIPTION OF THE DRAWINGS

Reference may now be made to the drawings, which illustrate various embodiments that the disclosure may take in physical form and in certain parts and arrangements of parts wherein.

DETAILED DESCRIPTION OF NON-LIMITING EMBODIMENTS

Figure 1:
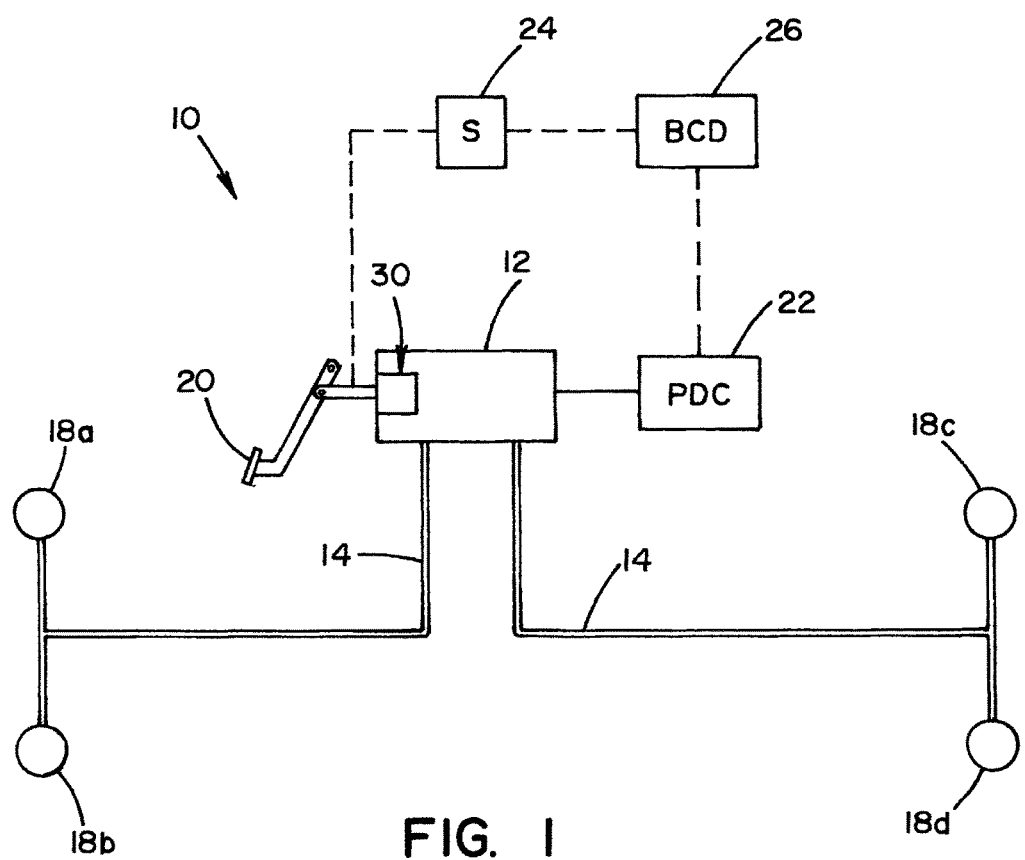
FIG. 1 illustrates an exemplary brake system including a modular non-linear spring system in accordance with the present disclosure.

Referring now to the drawings, wherein the showings are for the purpose of illustrating non-limiting embodiments of the present disclosure only and not for the purpose of limiting the same, FIGS. 1-7 illustrate various non-limiting embodiments of an improved modular non-linear spring system which is capable of simulating traditional brake pedal feel.

In FIG. 1, an exemplary brake system 10 generally includes a master cylinder 12 coupled via hydraulic lines 14 to respective brake assemblies 18a-18d associated with respective wheels of a vehicle. The hydraulic lines 14 supply pressurized fluid from the master cylinder 12 to the brake assemblies 18a-18d during braking. The master cylinder 12 in the illustrated exemplary system generates the required pressure to actuate the brake assemblies 18a-18d, either via a foot pedal 20 or other pressure developing component 22 (e.g., mechanical or electric pump, actuator, etc.).

In a convention hydraulic brake system, all braking pressure is developed by the driver through depression of the foot pedal. In the electro-hydraulic brake system of FIG. 1, the pressure development component 22 generates braking pressure in response to a brake demand signal generated by, for example, depression of the foot pedal 20. To this end, various sensors 24 are typically used to sense displacement of the foot pedal 20 and communicate such information to a brake control device 26, which in turn controls the pressure developing component 22 resulting in the master cylinder 12 generating braking pressure. Typical electro-hydraulic systems can also include a fail-safe function wherein the pedal 20 is used to directly generate braking pressure in the master cylinder 12 in the event of failure or malfunction of the pressure development component 22, related sensors, or brake control unit. It will be appreciated that electro-hydraulic brake systems can include various other components (e.g., actuators, sensors, etc.) for providing suitable system functionality. The specific arrangement of the brake system shown in FIG. 1 is merely for illustrative purposes, and it should be understood that aspects of the present disclosure are applicable to virtually any brake system wherein brake pedal feedback is desired.

In accordance with the present disclosure, a modular non-linear spring system 30 is designed to provide a non-linear, progressively increasing stroke length versus pedal force characteristic to the pedal 20. In such a configuration, the modular non-linear spring system 30 of the present disclosure behaves similarly to a conventional hydraulic braking system brake pedal in that the traditional brake pedal feel is maintained.

Figure 2:
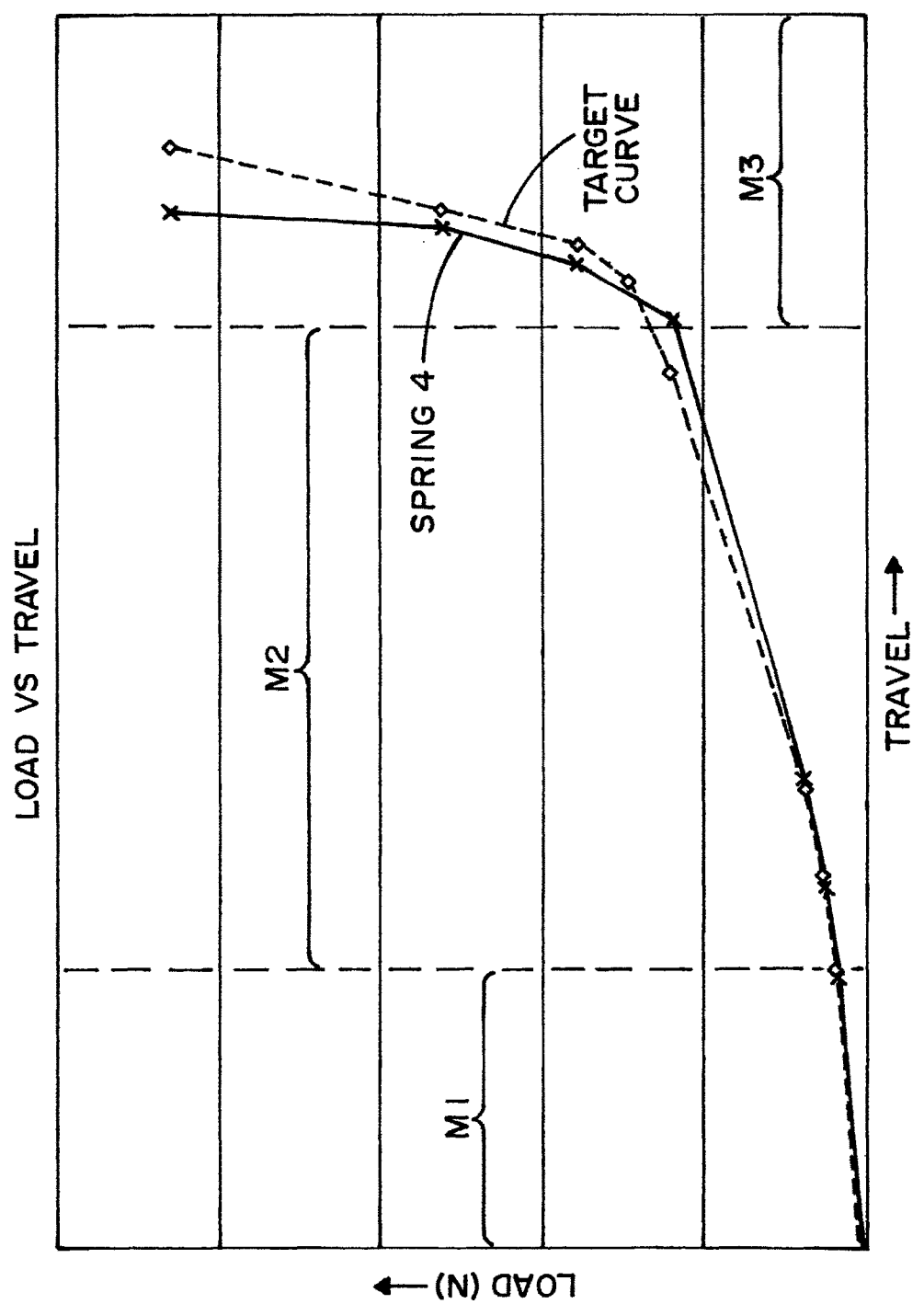
FIG. 2 illustrates a graph showing two load-vs-travel curves for a brake pedal.

The modular non-linear spring system 30 of the present disclosure is configured to simulate traditional brake pedal feel. FIG. 2 is a graphical illustration of stroke length (i.e., distance to which the pedal is depressed) versus pedal force. The data values labeled "Target Curve" provide a stroke length versus pedal force curve for a brake pedal in a traditional hydraulic brake system. As can be seen by the "Target" curve in FIG. 2, as the stroke length increases, the pedal force increases progressively and non-linearly. The modular non-linear spring system of the present disclosure (labeled Spring 4), when used as part of a hydraulic brake system, is capable of producing a pedal feel substantially similar to that of a traditional brake pedal.

As illustrated in FIG. 2, the first portion of the curve M1 illustrates the smallest slope wherein as the pedal or piston is initially moved, the load or resistance to the movement of the pedal or piston slowly increases. In this first portion, the Spring 4 line is generally linear, thus representing that essentially only one spring is being compressed in first curve portion M1. As such, if a first spring is configured to first compress and a second and third are configured to later compress, first curve portion M1 illustrates a linear compression first spring being initially compressed and the second and third spring being compressed less than 5-10%. The second portion of the curve M2 illustrates an increased slope (e.g., 20-150%) as compared to the slope in first curve portion M1. The slope of line Spring 4 in the second curve portion M2 is not fully linear. The slight curve of slope of line Spring 4 in the second curve portion M2 is due to two or more springs being compressed and/or one of the spring being a non-linear compression spring. The maximum slope of line Spring 4 in the third curved portion M3 has an increased slope of at least 1.5 times (e.g., 2-20 times, etc.) of the slope of the second curved portion M2. Although the pedal stroke length versus pedal force curve is illustrated in FIG. 2 as comprising substantially straight line segments between various data values (e.g., stroke length values), it can be appreciated that the curve(s) can be substantially continuous between data values.

Figure 3:
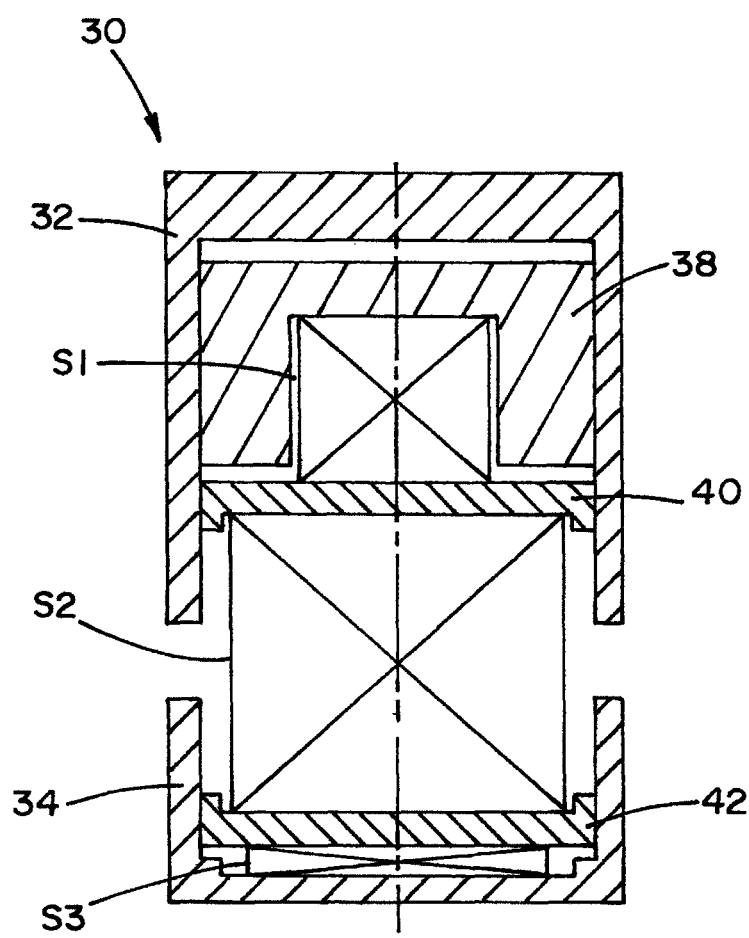
FIG. 3 is a schematic cross-sectional drawing of an exemplary spring system in accordance with the present disclosure.

As best seen in FIG. 3, the exemplary modular non-linear spring system 30 generally comprises upper and lower housing components 32 and 34 (which may be portions of the master cylinder itself, e.g., cavity walls). Supported within the housing components 32 and 34 are a piston 38 and spring seats 40 and 42 (also referred to herein as 'spacers'). A first spring S1 is captured between the piston 38 and sprint spring seat 40. A second spring S2 is captured between the spring seat 40 and the spring seat 42. A third spring S3 is captured between the spring seat 42 and the lower housing 34. The springs are aligned along a common central axis with each other and the spring seats 40 and 42. As will be appreciated, vertical movement of the piston 38 within the upper housing component 32 results in sequential compression of the springs (e.g., S1 then S2 then S3; S2 then S1 then S3; S2 then S3 then S1, etc.).

It should also be appreciated that the modular non-linear spring system 30 can be adjusted based on a driver-preferred driving and/or braking style. For example, the braking style can be selected from standard braking, performance braking, luxury braking, and/or sport braking. Generally, traditional hydraulic brake systems adopt a standard braking performance, as shown by the two curves in FIG. 2. By adjusting various characteristics of 1) the first mechanical spring S1, 2) the second mechanical spring S2, and/or 3) the third mechanical spring S3 of the modular non-linear spring system of the present disclosure, the braking performance can be adjusted between multiple driving styles. Although aspects of the present disclosure are directed to modular non-linear spring system embodiments for performance, luxury, standard, and sport braking performances, it can be appreciated that the present device can be modified and/or adjusted to fit any other desired driving style.

As seen in FIG. 2, the pedal stroke length versus pedal force curves are non-linear and have generally progressively increasing slopes, a typical characteristic of brake pedals in conventional hydraulic braking systems. The progressively increasing slope is due partially to 1) the characteristics of each individual mechanical spring, and/or 2) the combined effect of the characteristics of said individual mechanical springs. In one non-limiting configuration, the effect of each spring on pedal force can be amplified when one or more springs are used; however, this is not required. As can be appreciated, at least the shape, size and material characteristics of one or more of the springs can be adjusted to obtain a desired pedal stroke length versus pedal force curve.

The first and second mechanical springs S1 and S2 can be the same (e.g., coil compression springs) or different types of springs; however, this is not required. The third spring can be a Belleville spring; however, this is not required. As such, the modular non-linear spring system of the present disclosure provides a modularized braking mechanism wherein each mechanical spring compresses sequentially, wherein each spring can be responsible for a separate characteristic of each module. For example, in operation, as the brake pedal is actuated, a piston is caused to descend within the master cylinder, thereby increasingly compressing the first mechanical spring.

Returning to FIG. 2, the compression of the first mechanical spring S1 is illustrated by a first pedal travel, thereby also defining the first module M1. As the brake pedal is further actuated, the piston is caused to descend further within the master cylinder, now increasingly compressing the second mechanical spring S2 as described above. The compression of the second mechanical spring S2 is illustrated by a second pedal travel distance, thereby also defining a second module M2. As the brake pedal is still further actuated, the piston is caused to descend still further within the master cylinder, now increasingly compressing the third mechanical spring. The compression of the third mechanical spring S3 is illustrated by a third pedal travel distance, thereby defining a third module M3. As can be appreciated, other travel distances can be used. FIG. 2 demonstrates that by changing one or more springs, or one or more characteristics of the one or more springs, different braking performances can be provided. The springs can be configured such that during the compression on one spring, another spring has little or no compression. For example, first spring S1 and second spring S2 can be configured such that when first spring S1 is initially being compressed, second spring S2 will compress less than 5-10% of its full compression while first spring S1 is compressed less than 85-99% of its full compression. Likewise, second spring S2 and third spring S3 can be configured such that third spring S3 will compress less than 5-10% of its full compression while second spring S2 is compressed less than 85-99% of its full compression. As can be appreciated, the springs can be configured to compress at different times relative to the amount of compression of another spring.

Figure 4:
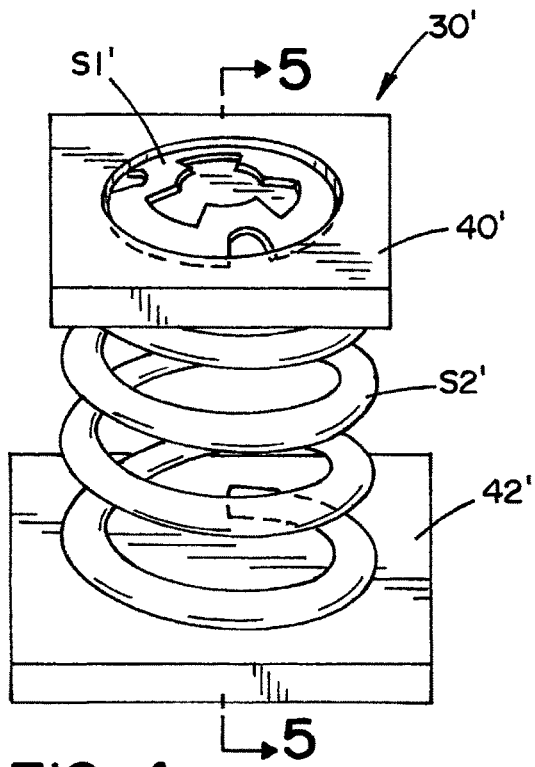
FIG. 4 is a perspective view of a first exemplary embodiment of a spring system in accordance with the present disclosure.
Figure 5:
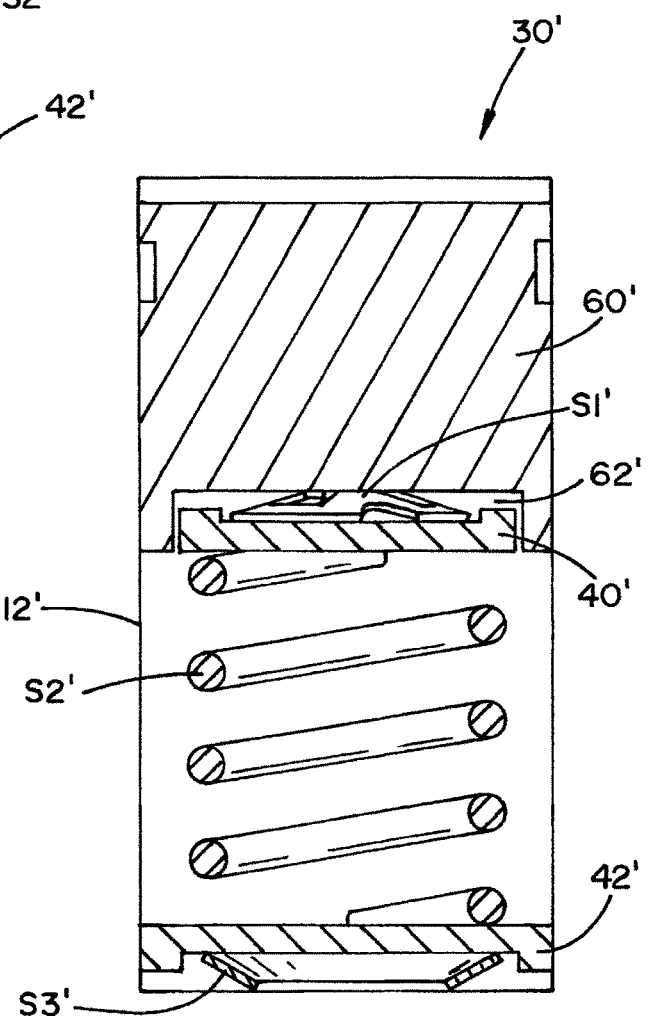
FIG. 5 is a cross-sectional view taken along the line 5-5 in FIG. 4.

Referring now to FIGS. 4 and 5, another exemplary embodiment of the modular non-linear spring system is illustrated and identified generally by reference numeral 30'. FIG. 4 illustrates the spring system 30' alone, while FIG. 5 illustrates the modular non-linear spring system 30' in cross-section installed within a cavity of a master cylinder 12'. The modular non-linear spring system 30' includes a first spring S1', a second spring S2' and a third spring S3'. First and second spacers 40' and 42' (also referred to as upper and lower spring seats, respectively) confine the second spring S2' therebetween. The first spring S1' is confined between the first spacer 40' and a piston 60' of the master cylinder 12'. The third spring S3' is confined between the second spacer 42' and the master cylinder 12'.

In the embodiment of FIGS. 4 and 5, the second spring S2' is a helical coil mechanical spring, while the first and second springs S1' and S2' are spring washers. For example, the first spring S1' can be a disc washer (e.g., a clover dome washer) while the third spring S3' can be, for example, a Belleville spring washer. The first spring S1' and at least portions of the spacer 40' are received within a recess 62' of the piston 60'.

The modular non-linear spring system 30' of the present disclosure can comprise many shapes and sizes; however, it is still capable of being inserted into the interior cavity of a master cylinder. In one non-limiting embodiment, the first mechanical spring can be recessed so as to seat securely within the piston recess (pocket). Similarly, the second mechanical spring can be seated within the first and second spring seats (i.e., spacers 40' and 42'). The third mechanical spring can be seated within the pocket of the master cylinder 12' below the lower spring seat (i.e., spacer 42'). As can be appreciated, the size of the first, second, and third mechanical springs S1', S2' and S3' can be selected to optimize braking performance and brake pedal feel.

Figure 6:
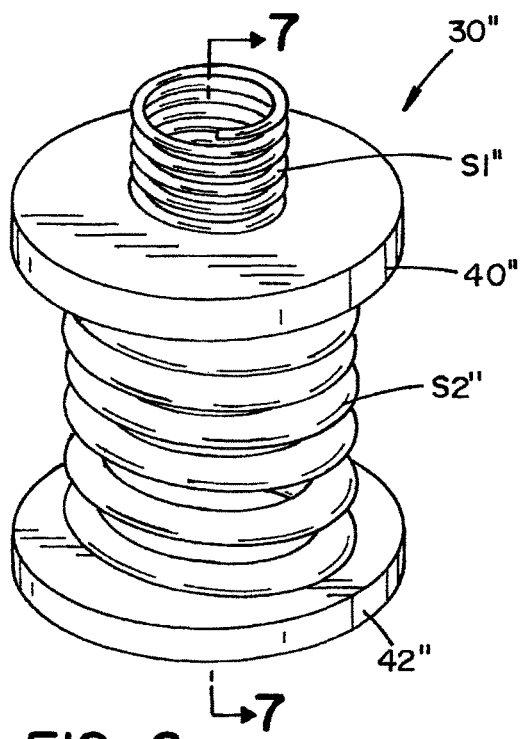
FIG. 6 is a perspective view of another exemplary embodiment of a spring system in accordance with the present disclosure.
Figure 7:
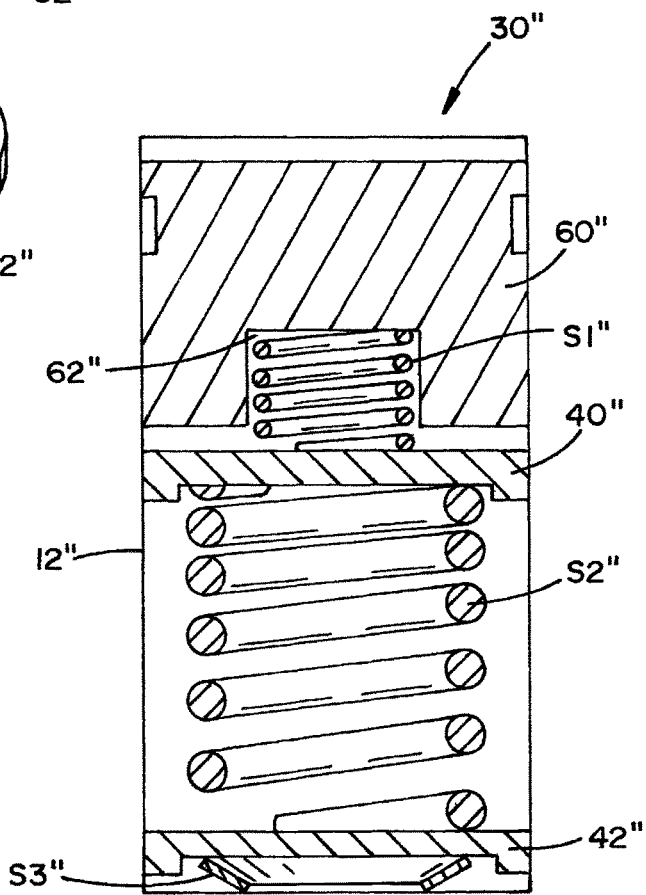
FIG. 7 is a cross-sectional view taken along the line 7-7 in FIG. 6.

Referring now to FIGS. 6 and 7, another exemplary embodiment of the modular non-linear spring system is illustrated and identified generally by reference numeral 30". The modular non-linear spring system 30" is similar to the embodiment of FIGS. 4 and 5 and has similar components as indicated by the double prime notation, except that the first spring S1" is a linear compression spring, and the second spring S2" is a multi-rate compression spring. S2" is a multi-rate spring in that the coil thickness vary along a length of the spring. As can be appreciated, S2" could be formed of two or more nested springs having different free lengths, coil materials, etc. to create a multi-rate spring.

In operation, when the modular non-linear spring system 30'/30" and the piston 60'/60" of the master cylinder 12'/12" are in a non-actuated position, the first spring S1'/S1" is negligibly compressed between the piston 60'/60" and the first spacer 40'/40". As the brakes are actuated, the piston 60'/60" is caused to move downwardly, thereby partially or fully compressing the first spring S1'/S1" against said first spacer 40/40". When the piston 60/60" continues to move downwardly, the first spacer 40'/40" is also caused to move downwardly, thereby partially or fully compressing the second spring S2'/S2" between the first spacer 40'/40" and second spacer 42'/42", and continued compression of the first spring S1'/S1" between the piston 60'/60" and the first spacer 40'/40". When the piston 60'/60" continues to move further downwardly, the second spacer 42'/42" is also caused to move downwardly, thereby exerting a force on the third spring S3'/S3". As such, the third spring S3'/S3" can become partially or fully compressed between the second spacer 42'/42" and a surface (inner wall) of the master cylinder 12'/12", the second spring S2'/S2" remains partially or fully compressed between the first spacer 40'/40" and the second spacer 42'/42", and the first spring S1'/S1" remains partially or fully compressed between the piston 60'/60" and the first spacer 40'/40". The partial and/or full compression of the first, second, and third springs provides a combination of non-linear, progressively increasing spring forces to match that of a conventional brake pedal.

In the illustrated embodiments, the first, second and third mechanical springs have an uncompressed axial length and a compressed axial length. The uncompressed length of the second mechanical spring is greater than the uncompressed lengths of the first and third mechanical springs. Further, the difference in the axial length of the second spring between its uncompressed state and compressed state may be greater than the difference in length between the uncompressed and compressed states of the first and second springs. As such, module M2 may have the greatest travel as compared to module M1 and module M3.

While considerable emphasis has been placed herein on the structures and configurations of the preferred embodiments of the disclosure, it will be appreciated that other embodiments, as well as modifications of the embodiments disclosed herein, can be made without departing from the principles of the disclosure. These and other modifications of the preferred embodiments, as well as other embodiments of the disclosure, will be obvious and suggested to those skilled in the art from the disclosure herein, whereby it is to be distinctly understood that the foregoing descriptive matter is to be interpreted merely as illustrative of the present disclosure and not as a limitation thereof.

What is claimed:

1. A modular non-linear spring system suitable for use in a vehicle braking system comprising:
   a first spacer having a top surface and a bottom surface;
   a first spring in abutting engagement with the top surface of said first spacer;
   a second spacer, said second spacer having a top surface and a bottom surface;
   a second spring in abutting engagement with the bottom surface of said first spacer and said second spring in abutting engagement with the top surface of said second spacer; and;
   a third spring in abutting engagement with the bottom surface of said second spacer;
   wherein said first, and second and third springs are sequentially compressible whereby compression of said first, second and third springs in said modular non-linear spring system provides a non-linear, progressively increasing mechanical spring force, and,
   wherein said first spring is a clover dome washer or a Belleville washer, said second spring is a coil spring, and said third spring is a clover dome washer or a Belleville washer.

2. The modular non-linear spring system as defined in claim 1, wherein said first and third springs have different spring rates, and/or are different spring types.

3. The modular non-linear spring system as defined in claim 2, wherein said first spring compresses 5-95% of its full compression length prior to said second spring compressing more than 1-10% of its full compression length.

4. The modular non-linear spring system as defined in claim 1, wherein said first spring compresses 5-95% of its full compression length prior to said second spring compressing more than 1-10% of its full compression length.

5. The modular non-linear spring system as defined in claim 4, wherein said first spring compresses 75-95% of its full compression length prior to said second spring compressing more than 1-10% of its full compression length.

6. The modular non-linear spring system as defined in claim 1, wherein said first spring compresses 75-95% of its full compression length prior to said second spring compressing more than 1-10% of its full compression length, said first and second springs compress 75-95% of each of their full compression lengths prior to said third spring compressing more than 1-10% of its full compression length.

7. A hydraulic brake system comprising a master cylinder having a cavity and a piston supported in the cavity, and a modular non-linear spring system as defined in claim 6 supported in the cavity and engageable with the piston of the master cylinder, and wherein the piston of the master cylinder is configured to compress at least one of said springs.

8. The hydraulic brake system as defined in claim 7, wherein at least one of said first, second and third springs are coaxially aligned along a common axis of the cavity.

9. The modular non-linear spring system as defined in claim 1, wherein at least one of said first and second spacers has a rectangular cross-sectional shape.

10. The modular non-linear spring system as defined in claim 1, wherein at least one of said first and second spacers has a circular cross-sectional shape.

11. The modular non-linear spring system as defined in claim 1, wherein at least one of said springs is a multi-rate spring.

12. A hydraulic brake system comprising a master cylinder having a cavity and a piston supported in the cavity, and a modular non-linear spring system as defined in claim 1 supported in the cavity and engageable with the piston of the master cylinder, and wherein the piston of the master cylinder is configured to compress at least one of said springs.

13. The hydraulic brake system as defined in claim 12, wherein at least one of said first, second and third springs are coaxially aligned along a common axis of the cavity.

14. A method of simulating traditional brake pedal feel in a brake pedal of a braking system comprising:
   providing a modular non-linear spring system as defined in claim 1; and
   compressing said springs in progression with the brake pedal.

15. A method of simulating traditional brake pedal feel in a brake pedal of a braking system comprising:
   providing a modular non-linear spring system as defined in claim 6; and
   compressing said springs in progression with the brake pedal.

16. A modular non-linear spring system suitable for use in a vehicle braking system comprising:
   a first spacer having a top surface and a bottom surface;
   a first spring in abutting engagement with the top surface of said first spacer;
   a second spacer, said second spacer having a top surface and a bottom surface;
   a second spring in abutting engagement with the bottom surface of said first spacer and said second spring in abutting engagement with the top surface of said second spacer; and;
   a third spring in abutting engagement with the bottom surface of said second spacer;
   wherein said first, second and third springs are sequentially compressible whereby compression of said first, second and third springs in said modular non-linear spring system provides a non-linear, progressively increasing mechanical spring force, and,
   wherein at least two of said first, second and third springs have different spring sizes, different spring rates, and/or are a different spring type, and,
   wherein said first spring compresses 75-95% of its full compression length prior to said second spring compressing more than 1-10% of its full compression length, said first and second springs compress 75-95% of each of their full compression lengths prior to said third spring compressing more than 1-10% of its full compression length, and,
   wherein the first spring is a clover dome washer or a Belleville washer or a coil spring, the second spring is a clover dome washer or a Belleville washer or coil spring, and the third spring is a clover dome washer or a Belleville washer or a coil spring, and,
   wherein each of the first, second and third springs has an uncompressed axial length and a compressed axial length, and wherein the uncompressed length of at least one spring is greater than the uncompressed length of at least one other spring, and
   wherein at least one of said springs is a multi-rate spring.

* * * * *